United States Patent
Jang et al.

(10) Patent No.: US 9,164,817 B2
(45) Date of Patent: Oct. 20, 2015

(54) MOBILE COMMUNICATION TERMINAL TO PROVIDE WIDGET EXPANSION FUNCTION USING MESSAGE COMMUNICATION, AND OPERATION METHOD OF THE MOBILE COMMUNICATION TERMINAL

(75) Inventors: Tae Ho Jang, Gunpo-si (KR); Jun Hyeong Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 13/118,644

(22) Filed: May 31, 2011

(65) Prior Publication Data

US 2012/0096096 A1    Apr. 19, 2012

(30) Foreign Application Priority Data

Oct. 13, 2010   (KR) .................. 10-2010-0099803

(51) Int. Cl.
*G06F 9/54*    (2006.01)
(52) U.S. Cl.
CPC ...................... *G06F 9/541* (2013.01)
(58) Field of Classification Search
None
See application file for complete search history.

(56) References Cited

U.S. PATENT DOCUMENTS

| | | | | |
|---|---|---|---|---|
| 6,195,694 B1 * | 2/2001 | Chen et al. | ................ | 709/220 |
| 6,766,351 B1 * | 7/2004 | Datla | ................ | 709/203 |
| 8,458,656 B1 * | 6/2013 | Liang et al. | ................ | 717/118 |
| 8,555,297 B1 * | 10/2013 | Gould et al. | ................ | 719/330 |
| 2001/0034771 A1 * | 10/2001 | Hutsch et al. | ................ | 709/217 |
| 2006/0155814 A1 * | 7/2006 | Bennett et al. | ................ | 709/207 |
| 2007/0073846 A1 * | 3/2007 | Reisman | ................ | 709/219 |
| 2007/0201654 A1 * | 8/2007 | Shenfield | ................ | 379/201.01 |
| 2008/0168106 A1 * | 7/2008 | Freedman | ................ | 707/201 |
| 2008/0244682 A1 * | 10/2008 | Sparrell et al. | ................ | 725/134 |
| 2010/0077378 A1 * | 3/2010 | Maguire et al. | ................ | 717/106 |
| 2010/0153866 A1 * | 6/2010 | Sharoni | ................ | 715/762 |
| 2011/0214131 A1 * | 9/2011 | Luna | ................ | 719/318 |
| 2011/0271289 A1 * | 11/2011 | Weiser et al. | ................ | 719/317 |
| 2012/0166655 A1 * | 6/2012 | Maddali et al. | ................ | 709/228 |

FOREIGN PATENT DOCUMENTS

| | | |
|---|---|---|
| JP | 2009-098825 | 5/2009 |
| KR | 10-2009-0096554 | 9/2009 |
| KR | 10-2010-0011649 | 2/2010 |
| KR | 10-2010-0050603 | 5/2010 |
| KR | 10-2010-0070659 | 6/2010 |
| KR | 10-2010-0070660 | 6/2010 |

* cited by examiner

*Primary Examiner* — Ian N Moore
*Assistant Examiner* — Eric P Smith
(74) *Attorney, Agent, or Firm* — NSIP Law

(57) ABSTRACT

A mobile communication terminal to provide a widget expansion function using a message communication, and an operation method of the mobile communication terminal is provided. The method includes a configuration of generating an additional function expansion message based on expansion of an additional function of a widget, and transmitting the generated additional function expansion message. The method also includes a configuration of expanding the additional function of the widget by receiving the additional function expansion message, by determining an application programming interface (API) library with respect to the expansion of the additional function, and by calling the determined API library.

17 Claims, 5 Drawing Sheets

MOBILE COMMUNICATION TERMINAL TO PROVIDE WIDGET EXPANSION FUNCTION USING MESSAGE COMMUNICATION, AND OPERATION METHOD OF THE MOBILE COMMUNICATION TERMINAL

CROSS-REFERENCE TO RELATED APPLICATION(S)

This application claims the benefit under 35 U.S.C. §119 (a) of Korean Patent Application No. 10-2010-0099803, filed on Oct. 13, 2010, in the Korean Intellectual Property Office, the entire disclosure of which is incorporated herein by reference for all purposes.

BACKGROUND

1. Field

The following description relates to a mobile communication terminal to provide a widget expansion function using a message communication, and an operation method of the mobile communication terminal.

2. Description of Related Art

Currently, with rapid development of a mobile communication terminal such as a smart phone and the like, an activation of a local service may be expected.

Figure 1:
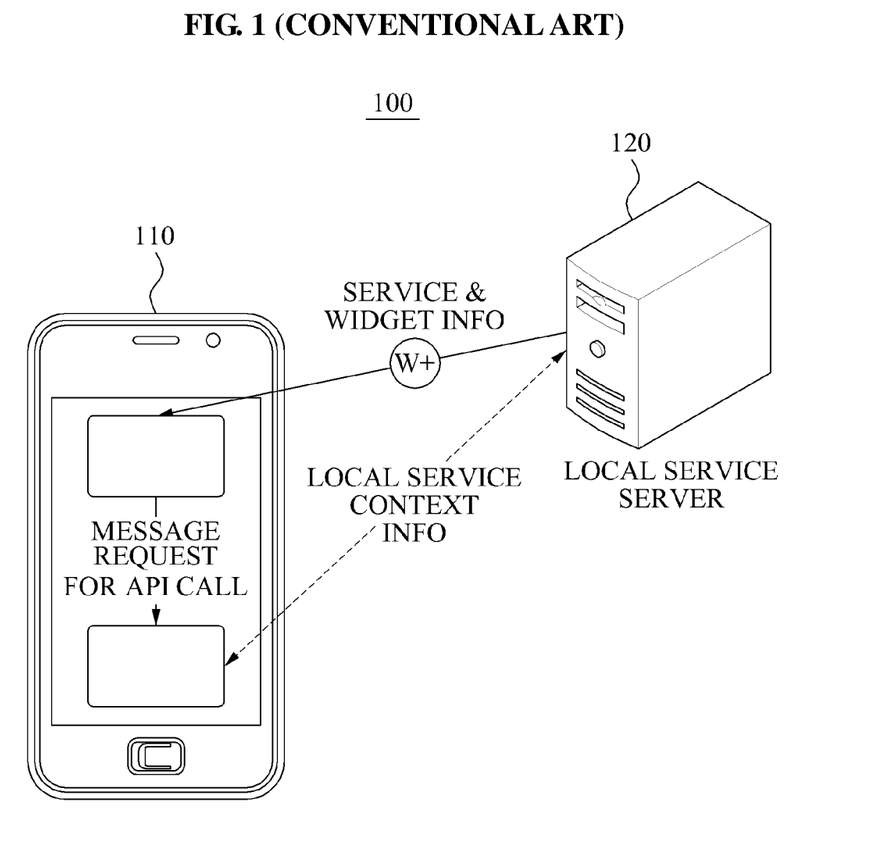
FIG. 1 is a diagram illustrating a communication system using an existing mobile communication terminal.

FIG. 1 illustrates a communication system 100 using an existing mobile communication terminal 110.

The communication system 100 may provide a local service such as, for example, a guide service, a reservation service, and a commercial transaction service, using a mobile phone based on user information. The user information may be a provider location in a predetermined region such as, for example, a school, a hospital, a shopping mall, a theme park, a gasoline station, and the like.

For the local service, the mobile communication terminal 110 may download a variety of mobile applications from a local service server 120 operated by a provider, and provide a service.

A downloadable mobile application may be classified into a native application scheme and a mobile web scheme. The native application may employ application programming interface (API) supported by a specific platform. The native application scheme may readily and quickly perform a system optimization including a user interface and support offline connection. The mobile web scheme may support a variety of devices in a multi-platform. Accordingly, an appropriate selection of the native application or mobile web scheme may be used depending on a necessity.

In the case of using the local service, when a service is provided using mobile web widgets, a user may readily access the service and use the service without being aware of a server address.

A drawback of an existing web widget is that it may not control a quick screen switch and hardware, like a game, and may be available only when a network is connected. The web scheme may create an application using a script including a Hypertext Markup Language (HTML), cascading style sheets (CSS), and JavaScript.

A manufacturing company provides a device API suggested in a standard interface, and a browser or a widget engine expands a function of the device API using a plug-in. When the function is expanded, the device API may be used. A standard JavaScript API may not directly control hardware and thus, the function of the browser or the widget engine may be expanded by defining a new JavaScript API using a native language such as, for example, C/C++.

With codes defined using the native language, a widget's JavaScript may be expanded in the widget engine using a static scheme and a plug-in scheme. In the case of a variety of mobile devices using the same platform, a device function may be used in combination with a plug-in. When the plug-in scheme is employed by a JavaScript API expanded in the browser or the widget engine, the device API may be directly called using a combined native code.

Figure 2:
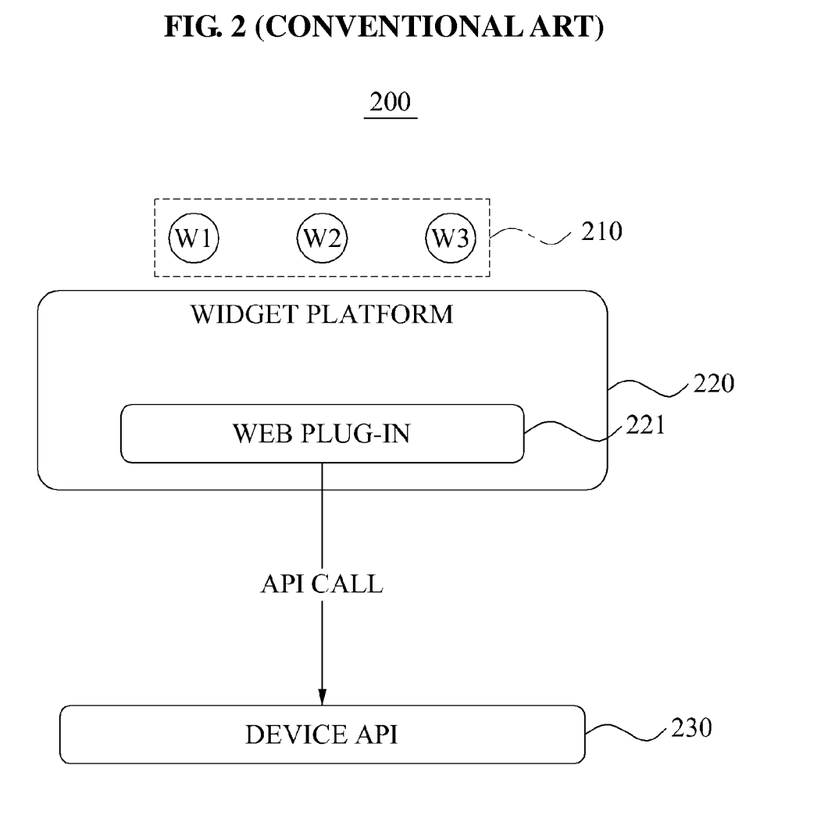
FIG. 2 is a diagram illustrating an expansion of an additional function of a widget in an existing mobile communication terminal.

FIG. 2 illustrates a process of calling an existing device API.

An expansion of an additional function of a widget in an existing mobile communication terminal 200 will be described with reference to FIG. 2.

The mobile communication terminal 200 using an existing web scheme may use a function expansion module for each widget W1, W2, and W3 210 using a widget platform 220.

Since an API library used for widgets W1, W2, and W3 210 is called from a device API 230 via a web plug-in 221, a development may be complex and a security may be vulnerable. In addition, since each of the widgets W1, W2, and W3 210 may not use a native language, an error occurrence probability may be significantly high.

SUMMARY

In one general aspect, there is provided a mobile communication terminal, including a widget platform providing unit to generate an additional function expansion message based on expansion of an additional function of a widget, and to transmit the generated additional function expansion message, and a widget manager to receive the additional function expansion message, to determine an application programming interface (API) library with respect to the expansion of the additional function, and to call the determined API library.

The widget manager may be configured to provide the called API library to the widget in a form of a response message.

The mobile communication terminal may include a storage unit to store at least one API library, wherein the widget manager may be configured to call an API library corresponding to the additional function expansion message from the stored at least one API library.

The widget manager may include a communication processing unit to provide an interface for receiving of the additional functional expansion message, and a message processing unit to analyze the received additional function expansion message, and to determine the API library based on the analysis.

The widget manager may include a security policy processing unit to determine a processing scheme of the called API library based on a predetermined security policy.

The widget manager may include an API library mapping processing unit to call the determined API library from the at least one API library.

The widget manager may be configured to transfer, to the widget, an execution result of the called API library and an execution result of a context awareness engine.

The widget manager may be configured to store the transferred execution results, and to provide a sharing function with other widgets.

In another general aspect, there is provided an operation method of a mobile communication terminal, the method including receiving an additional function expansion message that is generated based on an expansion of an additional function of a widget, determining an API library by analyzing the received additional function expansion message, calling the determined API library, and transferring an execution result of the called API library and an execution result of a context awareness engine.

The method may include determining a processing scheme of the called API library based on a predetermined security policy.

The method may include storing the transferred execution results, and providing a sharing function with other widgets.

In another general aspect, there is provided a mobile communication terminal including a widget to request a widget expansion function, and a manager to manage the request for the widget expansion function using a message communication.

The mobile communication terminal may include a platform providing unit to generate an additional function expansion message based on the request and transmit the generated additional function expansion message to the manager.

The manager may receive the additional function expansion message and determine an application programming interface (API) library corresponding to the expansion of the additional function.

The API library may be provided to the widget via the message communication.

The manager may store results of the API library provided to the widget, and share the results with other widgets.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Descriptions of related and known functions may be omitted where possible for conciseness. Also, terms used herein are defined to describe the example embodiments and thus, may be changed depending on a user, the intent of an operator, or a custom. Accordingly, the terms must be defined based on the following overall description of this specification.

Figure 3:
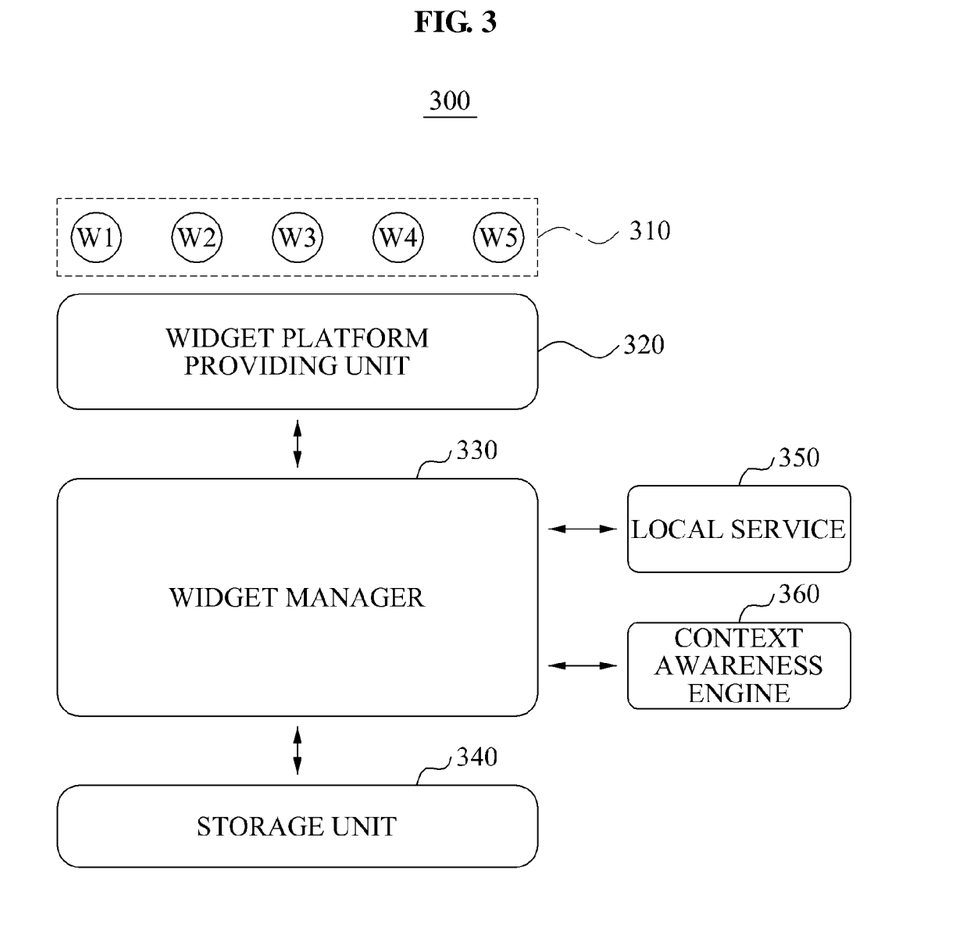
FIG. 3 is a diagram illustrating an example of a mobile communication terminal.

FIG. 3 illustrates an example of a mobile communication terminal 300.

The mobile communication terminal 300 may provide a local service for a guide, a reservation, and a commercial transaction, using a mobile phone, based on user information, for example, a provider location in a predetermined region such as, for example, a school, a hospital, a shopping mall, a theme park, and a gasoline station.

To provide the local service, the mobile communication terminal 300 may drive widgets W1, W2, W3, W4, and W5 310. Here, for example, a widget may correspond to a mini application program enabling a user to use functions such as weather, news, a calendar, a calculator, and the like. The widget may also allow the user to use functions such as news, games, and stock information, and the like, without using a web browser. The widget may herein be understood as a mini application program applied to the mobile communication terminal 300.

The mobile communication terminal 300 may expand an additional function of a widget to provide a predetermined service, for example, a local service and the like.

The expansion of the additional function may be embodied by a widget platform providing unit 320. When a widget script corresponding to a widget calls an added function, the widget platform providing unit 320 may transfer the called added function to a widget manager 330 in a form of a message instead of directly calling the added function using a web plug-in.

The widget manager 330 receiving the message may interpret the transferred message and call a corresponding application programming interface (API) library. The API library may correspond to the widget calling for the added function.

The widget manager 330 corresponds to a general native application and thus, may directly access a device API without using a separate plug-in according to a message request of the widget. Since the widget manager 330 stores and manages user information and environment information, the widget manager 330 may readily apply a security policy and protect a related code. When a widget is used in a mobile web application to access a local service, a variety of other widgets may be executed to access the local service in a relatively short period of time. Thus, when a plurality of widgets simultaneously and frequently accesses a device API and an intelligent API, it may be more efficient with regard to speed to access API information using the widget manager 330. The widget may synchronously download device API information results using the widget manager 330 without a procedure for accessing a device resource.

In addition, since a call module according to a widget request may be readily replaceable, virtual device information may be transferred to the widget by calling a pseudo sensing API using a network instead of using the device API depending on circumstances. Accordingly, by replacing a device API call module of the widget manager 330 with an emulator API call module, an emulation function for a device API may be provided and a development readability may be supported.

To expand the additional function of the widget, the widget platform providing unit 320 may generate an additional function expansion message and transmit the generated additional function expansion message to the widget manager 330.

The API library for expansion of the additional function may be stored and maintained in a storage unit 340.

The widget manager 330 may receive the additional function expansion message, determine an API library associated with the expansion of the additional function, and call the determined API library.

The widget manager 330 may provide the local service in interoperation with a local service server 350. For example, the widget manager 330 may analyze a widget package description downloaded from the local service server 350, or may collect widget execution information, or may control local service context information, for example, neighboring sensing information to be collected.

The widget manager 330 may provide the called API response to the widget in a form of a response message.

The widget manager 330 may perform an advance query and response through association with a context awareness engine 360.

According to example embodiments, a mobile application may provide a user with a convenience using a context awareness technology. For example, the widget manager 330 may provide an intelligent local service using an intelligent widget API interoperating with an inference engine of the widget. Accordingly, for the intelligent widget API, the widget manager 330 may share context awareness model information with the context awareness engine 360 and may obtain a desired result through a query.

Even though an application within a general mobile device may use an inference result through a direct interface with a context awareness engine, a service provider providing widgets may be unaware of context awareness engine information of an available user. Accordingly, the mobile communication terminal 300 may provide the intelligent local service using the widget manager 330.

According to example embodiments, it is possible to provide an independent framework to a browser and a web engine by processing expansion of an additional function of a widget using a message.

According to example embodiments, information regarding a service region and user context may be readily collected. A web widget API used for an intelligent local service may be additionally expanded. In addition, it is possible to readily and appropriately embody a complex algorithm and call a device API.

Figure 4:
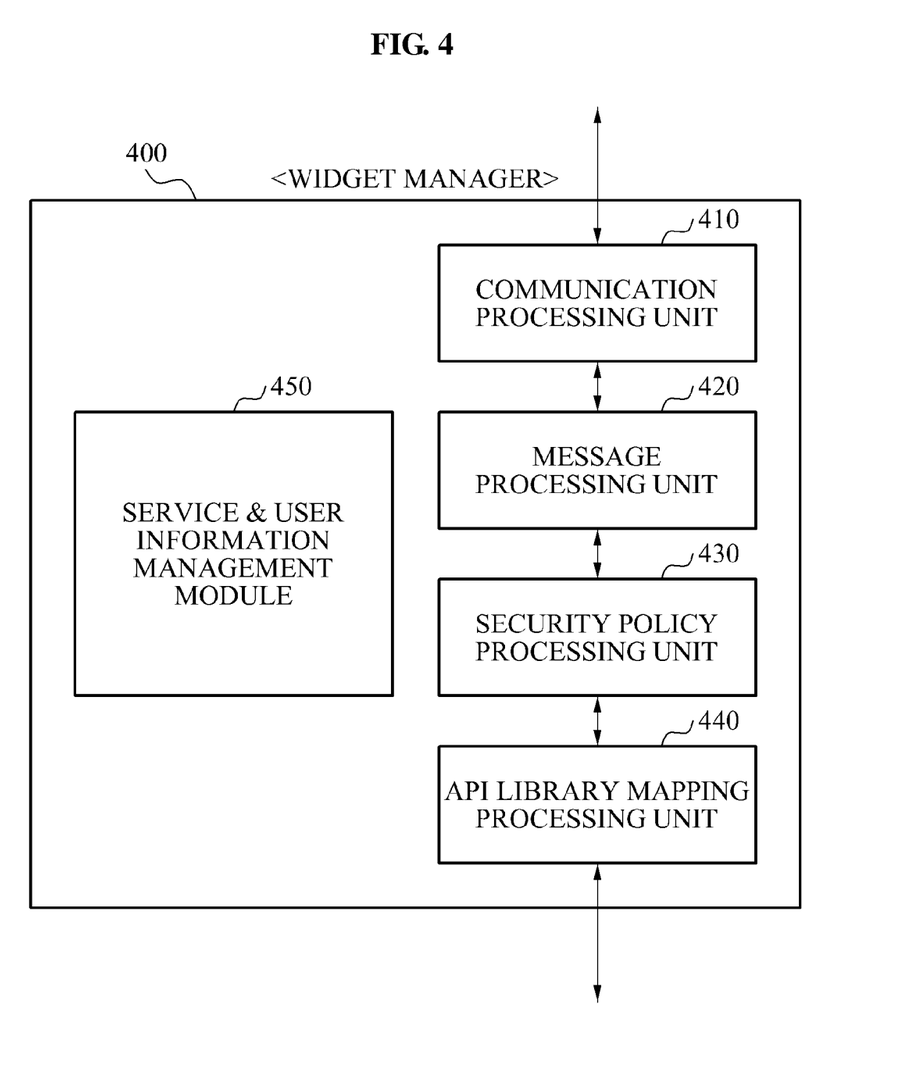
FIG. 4 is a diagram illustrating an example of a widget manager.

FIG. 4 illustrates an example of a widget manager 400.

Compared to directly expanding a function of a web widget using a plug-in, the widget manager 400 enables a communication and cooperation between widgets, and thus, a speed and a security of expanding a function of a widget may be enhanced.

In particular, a plurality of widgets and an intelligent engine such as a context awareness engine may be employed in an intelligent local service. Accordingly, the widget manager 400 may manage device and environment information, and may select a widget and an API and thus, may provide a user with a convenient and safe service.

Referring to FIG. 4, the widget manager 400 may include a communication processing unit 410, a message processing unit 420, a security policy processing unit 430, and an API library mapping processing unit 440.

The widget manager 400 may further include a service and user information management module 450 to manage service and user information.

The communication processing unit 410 may provide an interface for receiving of an additional function expansion message.

In interoperation with a communication module of a widget platform, the communication processing unit 410 may receive the additional function expansion message from the communication module, or may transmit a response message according to a call of an API library.

The message processing unit 410 may determine a suitable API library by analyzing the additional function expansion message requested from a widget. For example, the message processing unit 410 may analyze the received additional function expansion message and may determine the API library based on the analysis. The message processing unit 420 may discover an API feature used for the widget, select an available API module, and use the selected API module for API mapping.

The security policy processing unit 430 may determine a processing scheme of the called API library based on a predetermined security policy.

The API library mapping processing unit 440 may call an API function from the API library determined based on the analysis.

Prior to execution of a widget, the widget manager 400 may determine the widget and APIs suitable for a local service circumstance through negotiation. For example, when a user device supports a context awareness function, the widget manager 400 may request a local service server for downloading of an intelligent widget and designate an intelligent API call module suitable for an intelligent widget API feature, so that the widget may send a query and get a result from the context awareness engine.

When the intelligent widget requests an execution of an intelligent widget API using a communication API, the widget manager 400 may add context awareness engine information, transfer the context awareness engine information to the context awareness engine as a query, perform inference, and then transfer again an inference result to the widget. As such, the widget manager 400 may share the inference result with other widgets similar to a device API. A widget API request and a corresponding result may be transferred to a sensor abstraction layer (SAL) of the context awareness engine and be used as user information collected from the widget.

For the above operation, the widget manager 400 may store the transferred execution results and provide a sharing function with other widgets.

According to example embodiments, the widget manager 400 may enhance a single tasking structure and improve speed when employing a widget expansion function, and may also readily embody a complex algorithm. In addition, the widget manager 400 may be suitable for collecting sensor and user information, and enables cooperation and material sharing between widgets. The widget manager 400 may also maintain a security policy when accessing an API library and readily perform a development.

Figure 5:
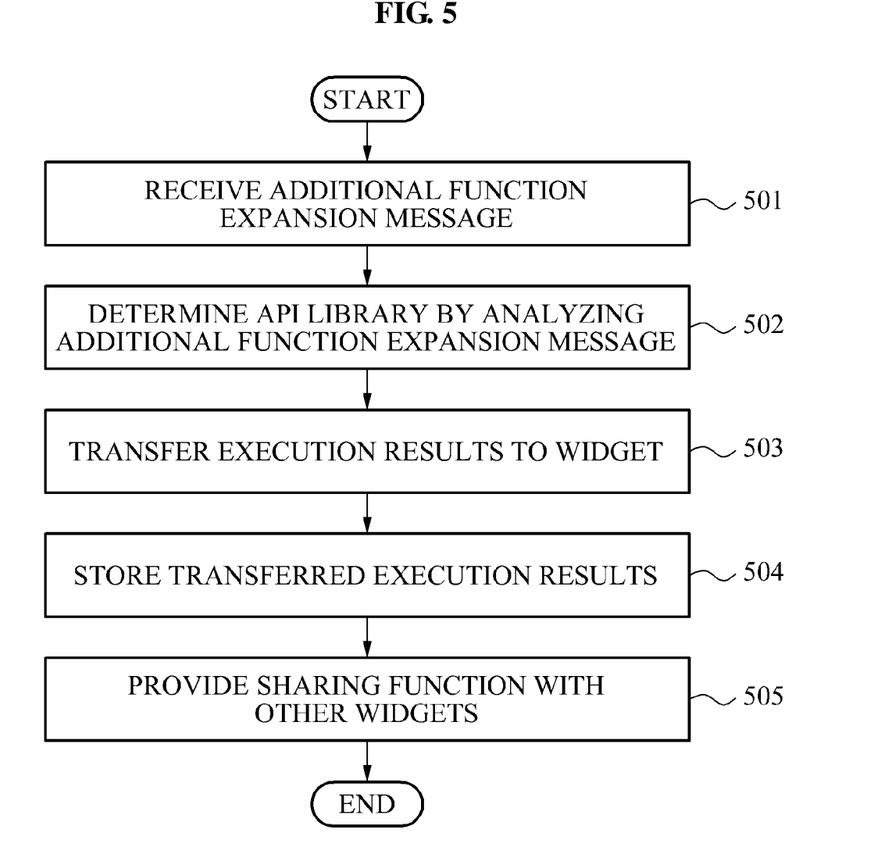
FIG. 5 is a flowchart illustrating an example of an operation method of a mobile communication terminal.

FIG. 5 illustrates an example of an operation method of a mobile communication terminal.

In operation 501, the operation method of the mobile communication terminal may receive an additional function expansion message that is generated based on an expansion of an additional function of a widget.

In operation 502, the operation method of the mobile communication terminal may determine an API library by analyzing the received additional function expansion message.

The operation method of the mobile communication terminal may determine a processing scheme of the called API library based on a predetermined security policy.

When the API library is determined, the operation method of the mobile communication terminal may call the determined API library.

In operation 503, the operation method of the mobile communication terminal may transfer an execution result of the called API function and an inference result from a context awareness engine.

In operation 504, the operation method of the mobile communication terminal may store the transferred execution results, and provide a sharing function with other widgets.

For the above operation, a widget manager applied to the mobile communication terminal may transfer an API execution result and a context awareness engine execution result to the widget in a form of a response message, and may manage and store the execution results. When a request is received, the widget manager may share the execution results with other widgets.

Since a script based API is reconfigured as a script using only a message communication API, a web plug-in may not be used to expand an additional function of a widget. The widget manager may periodically call a device API and an intelligent API as necessary or in response to a request, and may transfer related result information to widgets.

According to example embodiments, an operation method of a mobile communication method may correspond to a message communication scheme using a widget manager and thus, may additionally expand a script function of a widget and may not employ a complex web plug-in, and thus, may be independent from a web platform. The widget manager may call a device API and an intelligent API as a proxy, and may share corresponding results with other widgets. Accordingly, it is possible to support a service using a complex algorithm and to readily apply a security policy.

The processes, functions, methods and/or software described above including a communication method of a mobile communication terminal may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a non-transitory computer-readable storage medium may be distributed among computer systems connected through a network and non-transitory computer-readable codes or program instructions may be stored and executed in a decentralized manner.

According to example embodiments, it is possible to provide an independent framework to a browser and a web engine.

According to example embodiments, it is possible to readily collect service region and user context information.

According to example embodiments, it is possible to additionally expand a web widget API used for an intelligent local service.

According to example embodiments, it is possible to readily embody a complex algorithm and call a device API.

According to example embodiments, it is possible to enhance a single tasking structure and improve speed when adding a widget expansion function, and to readily configure a complex algorithm.

According to example embodiments, it is possible to collect sensor and user information.

According to example embodiments, cooperation and material sharing between widgets is enabled and it is possible to maintain security and to readily perform a development.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A mobile communication terminal, comprising:
a widget platform providing unit configured to generate an additional function expansion message based on expansion of an additional function of a widget, called by a widget script of the widget, wherein a widget is an application program executed at the mobile communication terminal that provides at least one function to a user at the mobile communication terminal without using a web browser, and to transmit the generated additional function expansion message; and
a widget manager configured to receive the additional function expansion message, to determine a device application programming interface (API) library that includes the additional function, and to call the device API library directly by interpreting the additional function expansion message of the widget,
wherein the calling of the device API library enables the widget to access a hardware device of the mobile communication terminal, without the widget using a procedure for directly accessing the hardware device.

2. The mobile communication terminal of claim 1, wherein the widget manager is configured to provide the called device API library to the widget in a form of a response message.

3. The mobile communication terminal of claim 1, further comprising:
a storage unit configured to store at least one device API library,
wherein the widget manager is configured to call the device API library corresponding to the additional function expansion message from the stored at least one device API library.

4. The mobile communication terminal of claim 1, wherein the widget manager comprises:
a communication processing unit configured to provide an interface for receiving of the additional function expansion message; and
a message processing unit configured to analyze the received additional function expansion message, and configured to determine the device API library based on the analysis.

5. The mobile communication terminal of claim 4, wherein the widget manager comprises:

a security policy processing unit configured to determine a processing scheme of the called device API library based on a predetermined security policy.

6. The mobile communication terminal of claim 4, wherein the widget manager comprises:
an API library mapping processing unit configured to call the device API library from at least one device API library.

7. The mobile communication terminal of claim 1, wherein the widget manager is configured to transfer, to the widget, an execution result of the called device API library and an execution result of a context awareness engine.

8. The mobile communication terminal of claim 7, wherein the widget manager is configured to store the transferred execution results, and to provide shared access to the additional function of the determined API library for other widgets.

9. The mobile communication terminal of claim 1, wherein the widget manager comprises a general native application that directly accesses the device API library without the use of a web plug-in.

10. A method of a mobile communication terminal, the method comprising:
receiving an additional function expansion message that is generated based on an expansion of an additional function of a widget, called by a widget script of the widget, wherein a widget is an application program executed at the mobile communication terminal that provides at least one function to a user at the mobile communication terminal without using a web browser;
determining a device application programming interface (API) library that includes the additional function;
calling the device API library directly by interpreting the additional function expansion message of the widget; and
transferring an execution result of the called device API library and an execution result of a context awareness engine to the widget,
wherein the calling of the device API library enables the widget to access a hardware device of the mobile communication terminal, without the widget using a procedure for directly accessing the hardware device.

11. The method of claim 10, further comprising:
determining a processing scheme of the called device API library based on a predetermined security policy.

12. The method of claim 10, further comprising:
storing the transferred execution results, and providing shared access to the additional function of the determined API library for other widgets.

13. A non-transitory computer-readable medium comprising a program for instructing a computer to perform a method of a mobile communication terminal, the method comprising:
receiving an additional function expansion message that is generated based on an expansion of an additional function of a widget, called by a widget script of the widget, wherein a widget is an application program executed at the mobile communication terminal that provides at least one function to a user at the mobile communication terminal without using a web browser;
determining a device application programming interface (API) library that includes the additional function;
calling the device API library directly by interpreting the additional function expansion message of the widget; and
transferring an execution result of the called device API library and an execution result of a context awareness engine to the widget,
wherein the calling of the device API library enables the widget to access a hardware device of the mobile communication terminal, without the widget using a procedure for directly accessing the hardware device.

14. A mobile communication terminal, comprising:
a widget configured to request an expansion function called by a widget script corresponding to the widget, wherein a widget is an application program executed at the mobile communication terminal that provides at least one function to a user at the mobile communication terminal without using a web browser; and
a manager configured to determine a device application programming interface (API) library that includes the additional function, and configured to call the device API library that includes the additional function directly by interpreting the request of the widget,
wherein the calling of the device API library enables the widget to access a hardware device of the mobile communication terminal, without the widget using a procedure for directly accessing the hardware device.

15. The mobile communication terminal of claim 14, further comprising:
a platform providing unit to generate an additional function expansion message based on the request and to transmit the generated additional function expansion message to the manager.

16. The mobile communication terminal of claim 14, wherein the called device API library is provided to the widget via the message communication.

17. The mobile communication terminal of claim 14, wherein the manager stores results of the device API library provided to the widget, and shares the results with other widgets.

* * * * *